United States Patent
Pap et al.

(10) Patent No.: US 11,927,262 B2
(45) Date of Patent: Mar. 12, 2024

(54) LUBRICATION DEVICE FOR TURBOMACHINE REDUCTION GEAR

(71) Applicant: SAFRAN TRANSMISSION SYSTEMS, Colombes (FR)

(72) Inventors: Bálint Pap, Moissy-Cramayel (FR); Patrice Jocelyn Francis Gedin, Moissy-Cramayel (FR); Antoine Jacques Marie Pennacino, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 264 days.

(21) Appl. No.: 17/661,869

(22) Filed: May 3, 2022

(65) Prior Publication Data

US 2022/0364641 A1    Nov. 17, 2022

(30) Foreign Application Priority Data

May 6, 2021    (FR) ........................................ 2104786

(51) Int. Cl.
*F16H 57/04*    (2010.01)
*F01D 25/18*    (2006.01)

(52) U.S. Cl.
CPC ......... *F16H 57/0482* (2013.01); *F01D 25/18* (2013.01); *F16H 57/0427* (2013.01); *F16H 57/0471* (2013.01); *F05D 2260/40311* (2013.01)

(58) Field of Classification Search
CPC .............. F16H 57/082; F16H 57/0427; F16H 57/0471; F01D 25/18; F05D 2260/40311
USPC ........................................................ 475/159
See application file for complete search history.

(56) References Cited

U.S. PATENT DOCUMENTS

| | | | | |
|---|---|---|---|---|
| 2010/0317478 A1* | 12/2010 | McCune | ............... | F01D 25/186 475/159 |
| 2015/0300255 A1* | 10/2015 | Gallet | ................. | F16H 57/0427 475/159 |
| 2017/0307062 A1* | 10/2017 | Cipolla | ..................... | F02C 7/36 |

FOREIGN PATENT DOCUMENTS

| | | |
|---|---|---|
| EP | 3351829 A1 | 7/2018 |
| FR | 2987416 A1 | 8/2013 |
| FR | 3041054 A1 | 3/2017 |
| FR | 3047279 A1 | 8/2017 |
| FR | 3074552 A1 | 6/2019 |

OTHER PUBLICATIONS

French Search Report issued in French Application FR 21 04786 dated Nov. 22, 2021 (2 pages).

* cited by examiner

*Primary Examiner* — Colby M Hansen
(74) *Attorney, Agent, or Firm* — Bookoff McAndrews, PLLC

(57) ABSTRACT

Lubrication device for a turbomachine reduction gear, the device comprising an annular lubricating oil collecting cup delimited by a first wall and a second wall, said cup being divided by internal walls extending between the first wall and the second wall so as to define a plurality of angular sectors forming oil collection basins, the basins being circumferentially adjacent around the axis and comprising lubricating oil outlets, characterized in that one or more of said internal walls have openings allowing oil to pass between the circumferentially adjacent basins, characterized in that said openings (58) are formed in one or more of said internal walls so as to define one or more rows of openings in said one or more internal walls.

9 Claims, 4 Drawing Sheets

[Fig. 1]
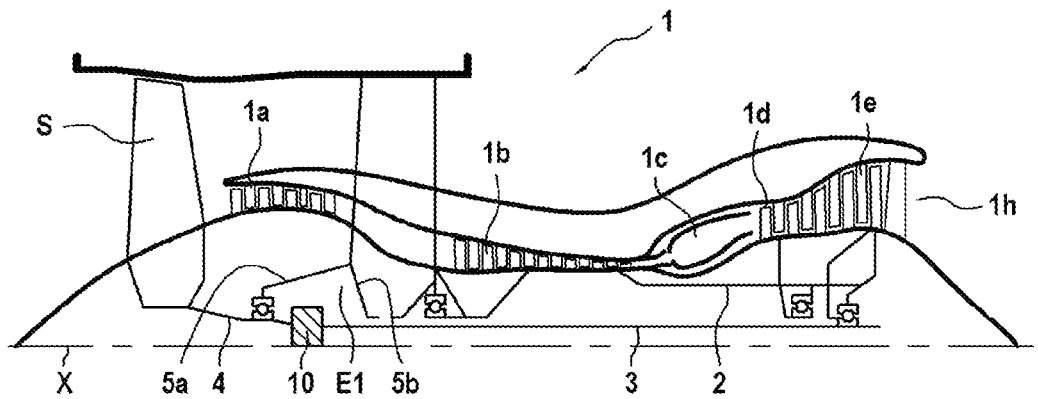
[Fig. 2]
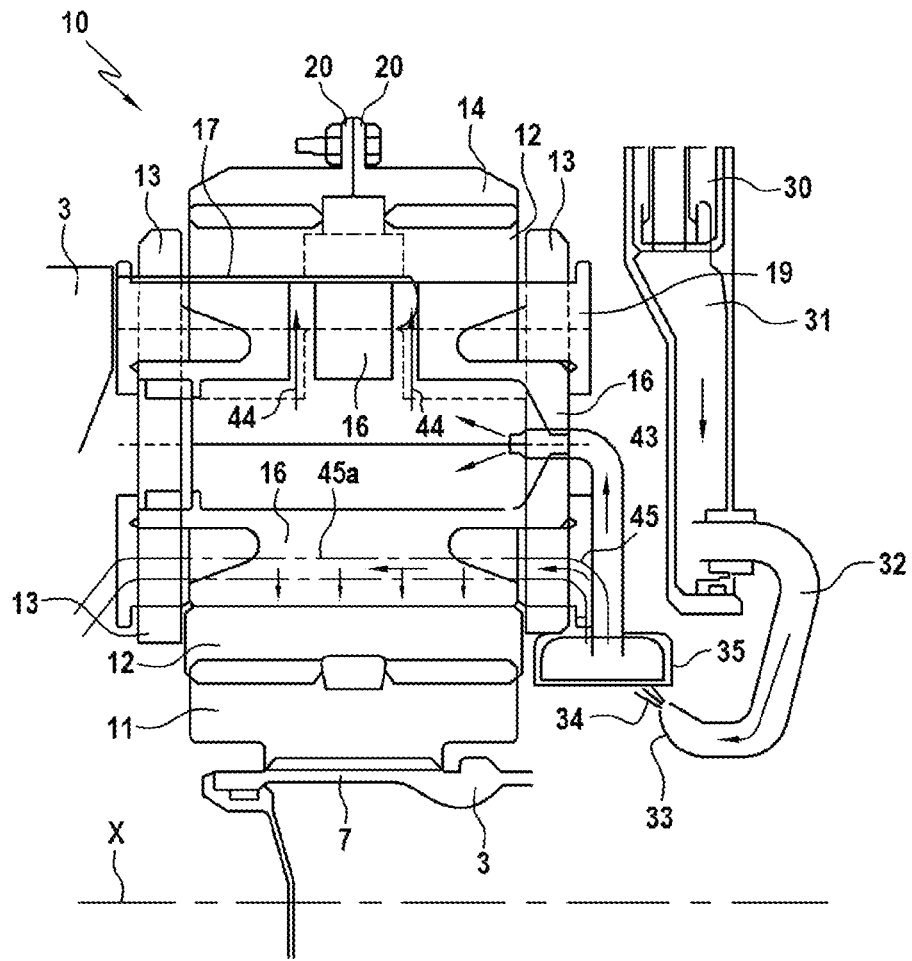

[Fig. 3]
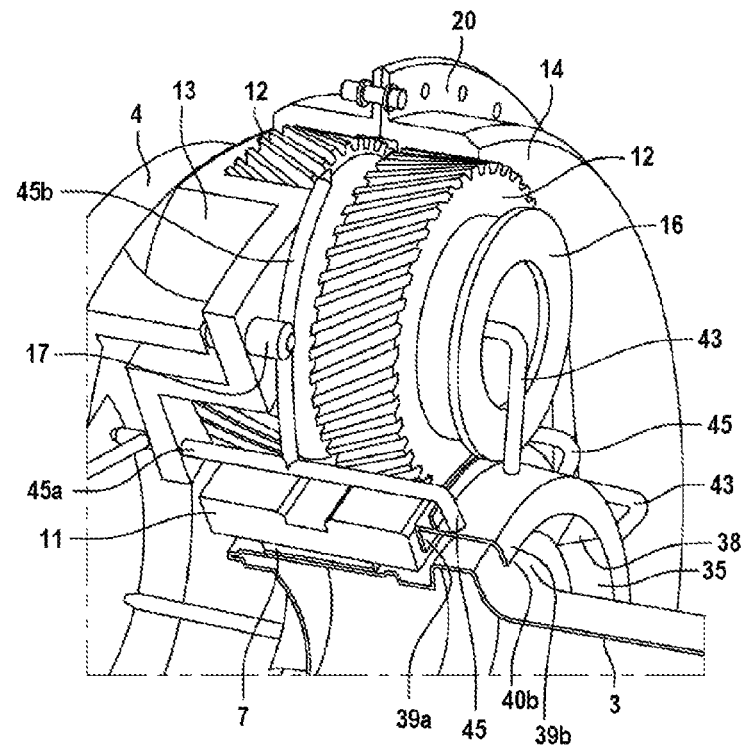
[Fig. 4]
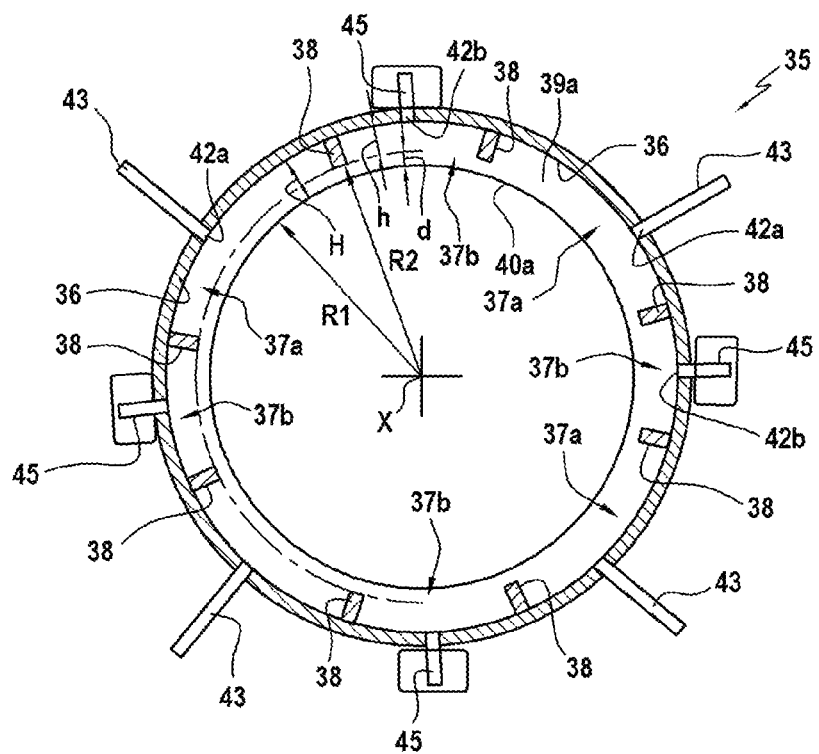

[Fig. 5]
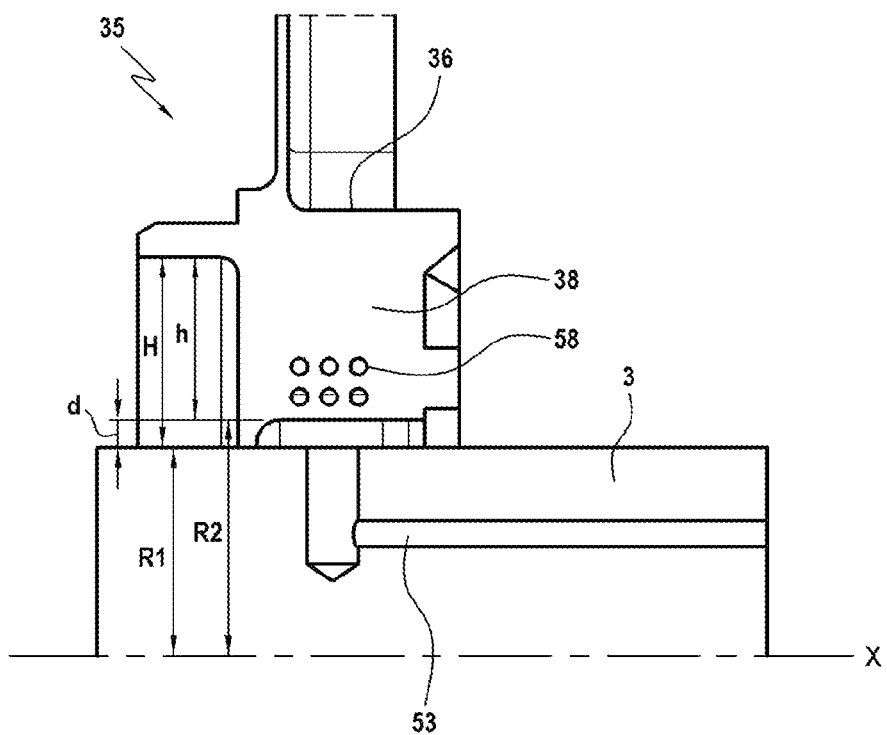
[Fig. 6]
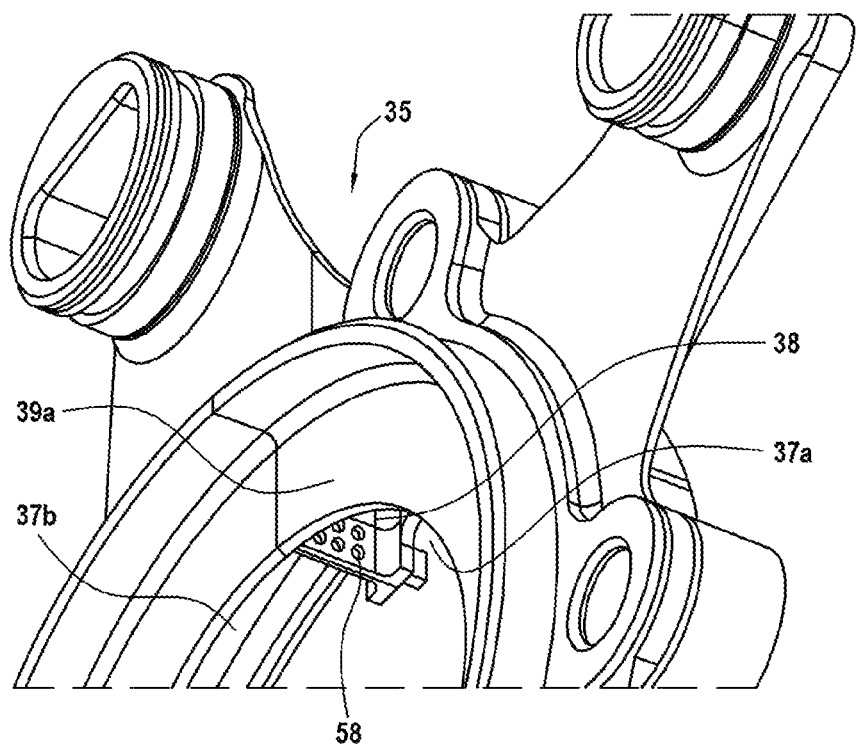

[Fig. 7]
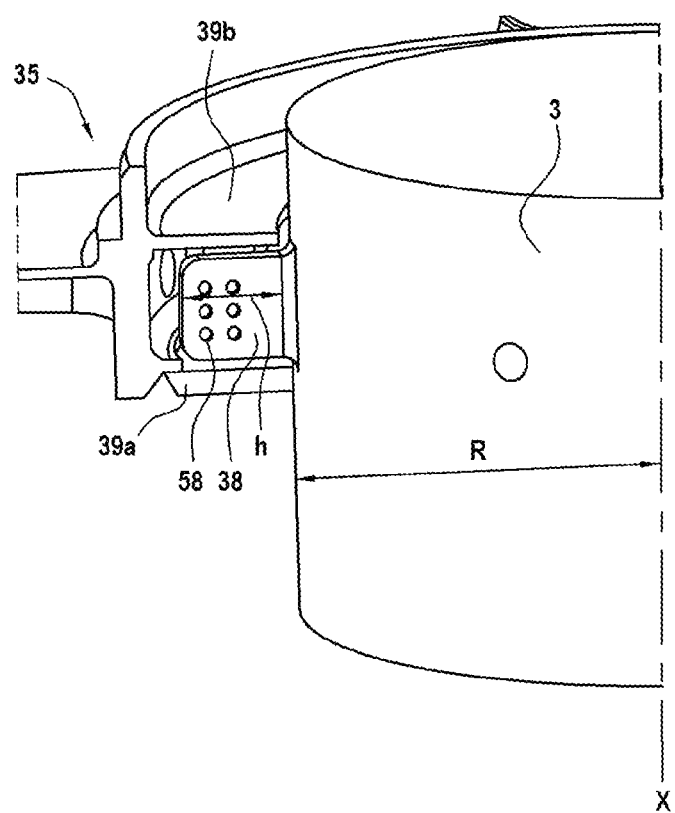

LUBRICATION DEVICE FOR TURBOMACHINE REDUCTION GEAR

CROSS-REFERENCE TO RELATED APPLICATIONS

This application claims priority to French Patent Application No. 2104786, filed on May 6, 2021, which is incorporated by reference herein in its entirety.

TECHNICAL FIELD

The present disclosure relates to the field of turbomachines, and encompasses, more precisely, distributors of oil between two movable components of a turbomachine in rotation relative to one another.

PRIOR ART

The distribution of oil between two elements of a turbomachine movable in rotation relative to one another, for the purpose of ensuring the lubrication and cooling of the components, poses problems linked in particular to the effect of the oil on the rotation movement, and in particular the risk of unbalancing and vibrations that an accumulation of oil could cause.

Document FR3041054 thus has an oil distribution system for a turbomachine reduction gear, in which the planet carrier comprises an oil supply cup, provided with radial walls defining a plurality of basins suitable for receiving oil and connected to oil distribution circuits. The distribution of oil in the basins thus allows distributing the oil between the different oil distribution circuits.

Document FR3047279 also has a similar system, in which the oil is distributed between different basins arranged around the axis of rotation.

The structures presented in these documents have, however, a problem in the event of loss of balance between the different basins, which can lead to the formation of an unbalanced mass, and thus impact the rotation movement.

The present disclosure thus seeks to respond at least partially to this problem.

DISCLOSURE OF THE INVENTION

The present disclosure thus relates to a lubrication device for a turbomachine reduction gear, having a main axis,
the device comprising an annular lubricating oil collecting cup delimited by a first wall and a second wall,
said cup being divided by internal walls extending between the first wall and the second wall so as to define a plurality of angular sectors forming oil collecting basins, the basins being circumferentially adjacent around the axis and comprising lubricating oil outlets intended for the lubrication of the reduction gear, wherein one or more of said internal walls have openings allowing oil to pass between the circumferentially adjacent basins,
characterized in that said openings are formed in one or more of said internal walls so as to define one or more rows of openings in said one or more internal walls.

According to one example, each of said internal walls comprises at least one opening.

According to one example, said internal walls have a height h measured in the radial direction, and in which openings are formed in a radially internal half of each internal wall.

According to one example, said internal walls have a height h measured in a radial direction relative to the main axis, and in which the openings are formed in a radially external half of each internal wall.

Said rows of openings are typically arranged, in said one or more internal walls (38), in lines and in columns, so as to form a matrix of openings.

The present disclosure also relates to a reduction gear comprising an input shaft, a sun wheel, planet gears and an output shaft,
said reduction gear comprising a device as previously defined, mounted axially around the input shaft, so that the oil outlets of the basins are oriented to lead to the planet gears, the sun wheel or the planet gear bearings.

The invention also relates to an assembly comprising a shaft extending around a main axis and a device as previously defined extending around said main axis, in which said internal walls are formed on the shaft.

The invention also relates to an assembly comprising a shaft extending around a main axis and a device as previously defined extending around said main axis, in which said internal walls are formed on the cup.

The present disclosure also relates to a turbomachine comprising a reduction gear of this type.

BRIEF DESCRIPTION OF THE DRAWINGS

The invention and its advantages will be better understood upon reading the detailed description given hereafter of different embodiments of the invention given by way of non-limiting examples.

FIG. 1 shows schematically an axial section view of a turbomachine implementing the invention.

FIG. 2 shows a detailed section view of a reduction gear with an epicyclic gear train, equipped with an impeller according to the invention.

FIG. 3 is an exploded perspective view of the reduction gear of FIG. 2.

FIG. 4 shows a schematic view of an impeller of an assembly according to the invention.

FIG. 5 shows a schematic axial section view of an impeller of an assembly according to the invention.

FIG. 6 shows an axial perspective view of an impeller of an assembly according to the invention.

FIG. 7 has a perspective view of an assembly according to an embodiment of the invention.

In all the figures, common elements are designated by identical numerical references.

DESCRIPTION OF THE EMBODIMENTS

With reference to FIG. 1, the invention relates, for example, to a turbomachine 1 which conventionally includes a fan propeller S, a low-pressure compressor 1a, a high-pressure compressor 1b, a high-pressure turbine 1d, a low-pressure turbine 1e and an exhaust nozzle 1h. The high-pressure compressor 1b and the high-pressure turbine 1d are connected by a high-pressure shaft 2 and form with it a high-pressure (HP) spool.

The low-pressure compressor 1a and the low-pressure turbine are connected by a low-pressure shaft 3 and form with it a low-pressure (LP) spool. In an example of a configuration, the fan propeller S is driven by a fan shaft 4 which is coupled to the LP shaft 3 by means of a reduction gear 10 with an epicyclic gear train. The reduction gear 10 is positioned in the upstream portion of the turbomachine. A fixed structure including schematically, here, an upstream portion 5a and a downstream portion 5b, is arranged so as to form an enclosure E1 surrounding the reduction gear 10.

This enclosure E1 is closed upstream here by seals at a bearing 6a allowing the crossing of the fan shaft 4, and downstream by seals at the crossing 6b of the LP shaft 3.

With reference to FIGS. 2 and 3, the reduction gear comprises a ring gear 14 which is attached, via a support casing 20, to said fixed structure 5a, 5b with flexible means arranged to allow it to follow the possible movements of the fan shaft 4. These attachment means are known to a person skilled in the art and are not detailed here.

A brief description of it can be found in FR-A1-2987416. The reduction gear 10 of the example is engaged on the one hand on the LP shaft 3 via splines 7 which drive a sun gear 11, and on the other hand to the fan shaft 4 which is attached to a planet carrier 13. Conventionally, the sun gear 11, the axis of rotation of which is conflated with that of the turbomachine, drives a series of planet gears 12 which are distributed regularly over the circumference of the reduction gear 10. The number of planet gears 12 is generally defined between three and six. The planet gears 12 also rotate around the axis X of the turbomachine, by engaging on the inner teeth of the ring gear 14, which is mounted fixed with respect to the turbomachine, via the support casing 20. Each of the planet gears 12 rotates freely around a planet gear axis 16 connected to the satellite carrier 13, by means of a bearing which can be smooth, as shown in FIG. 2, or a rolling-element bearing (ball or roller bearings). The rotation of the planet gears 12 around their planet gear axis 16, due to the cooperation of their gears with the teeth of the ring gear 14, causes the rotation of the planet carrier 13 around the axis X, and consequently that of the fan shaft 4 which is linked to it, at a rotation speed with is less than that of the LP shaft 3. The driving of the fan shaft 4 by the planet carrier 13 is ensured by a series of centering fingers 17, distributed regularly over the circumference of the reduction gear 10, which extend axially from the downstream end of the fan shaft 4 and which extend into bores provided in the planet carrier 13. The planet carrier 13 extends symmetrically on either side of the planet gear axes 16 and forms an enclosure in which a gearing lubrication function can be implemented. Closure sleeves 19 at the ends of the planet 16 axes allow closing this enclosure at the planet bearings 12.

FIG. 2 shows, with FIG. 3, the routing of the oil to the reduction gear 10 and its routing inside it. Arrows in FIG. 2 show the routing followed by the oil from, in this example, a buffer reservoir 31 linked to the fixed structure of the turbomachine, to the gears and the bearings to be lubricated. The lubrication device includes schematically three portions which will be described hereafter in succession, a first portion linked to the fixed structure and delivering oil to the rotation portions of the reduction gear 10, a rotating impeller with the planet carrier 13 receiving this oil, and the oil distribution circuits supplied with oil by the impeller to route it to the places to be lubricated. The first portion includes at least one injector 32 of which the calibrated end is constricted to form a sprinkler 33.

The oil is brought to the injector by a routing pipe, originating in the reservoir of the engine (not shown). A buffer reservoir 31 can be interleaved next to the reduction gear 10 on the pipe, preferably on the upper part so that the oil can flow toward the center of the reduction gear by gravity. The sprinkler 33 ejects the oil in the form of a jet 34, which forms under the pressure produced jointly by the feed pump (not shown) and by the weight of the oil column located above it. The sprinkler 33 is positioned radially here inside the planet carrier 13 relative to the axis X and the jet 34 is oriented with a radial component directed to the outside of the reduction gear 10.

With reference to FIGS. 3 and 4, the impeller for receiving oil linked to the planet carrier 13 includes essentially a cylindrical cup, here with a radial U shaped cross section, the U-shaped opening of which is oriented in the direction of the axis of rotation X. The shaft 3 is not shown in FIG. 4; it is centered on the axis X.

The impeller is arranged on the planet carrier 13 so that the bottom 36 of the U of the cup 35 collects the oil jet 34 ejected by the sprinkler 33.

According to the invention, the cup 35 of the impeller is divided here into a circumferential succession of basins 37a, 37b separated by walls 38 oriented radially and extending axially between the two lateral walls 39a, 39b of the U formed by the cup 35. In the example presented, the circumferential separation walls 38 delimit two alternating series of four basins 37a, 37b with an identical circumferential extension in one series but different from one series to the other. Thus the basins are circumferentially adjacent around the axis of rotation X. The basins thus define a plurality of distinct angular sectors within the cup 35. By centrifugation, when the impeller rotates with the planet carrier 13, the oil received on the bottom 36 of the cup 35 is driven in rotation and put under pressure between the bottom 36 and the lateral walls 39a, 39b of the cup 35. Each basin 35a, 35b, passing in succession before the sprinkler 33 during the rotation, collects a quantity of oil proportional to its circumferential extension. In fact, the radially inward edges of the walls 39a-39b-38 of a basin 37a, 37b define an inlet surface of the basin in the radial direction. This oil remains confined between the walls 38, 39a, 39b of the basin 37a, 37b as long as the level of oil relative to the bottom 36 remains less than the minimum height h of its walls 38 relative to the bottom 36. The radially internal walls 40a, 40b of the lateral walls 39a, 39b are substantially circular. Their radius R1 defines a general depth H of the cup 35 relative to the bottom 36.

In the example illustrated, the circumferential separation walls 38 have an inner radial edge 41 located at a distance R2 from the axis X slightly greater than the radius R1 of the inner edges 40a, 40b of the lateral walls 39a, 39b. In the example illustrated, the height h of the circumferential separation walls 38 relative to the bottom 36 of the basins 37a, 37b is therefore slightly less than the height H of the lateral walls 39a, 39b relative to this same bottom 36. Thus a height difference d is generated equal to H-h.

This height difference d is typically small; it is sufficient that it allows the oil to flow above the circumferential separation walls 38 instead off passing by the inner edges 39a, 39b of the lateral walls 40a, 40b, if the oil level rises in a basin 37a, 37b.

Typically, for a turbomachine reduction gear 10 of the type of that presented here, a height difference of the order of 3 millimeters can suffice.

Moreover, the bottom 36 of each basin 37a, 37b includes an opening 42a, 42b which communicates with a pipe 43, 45 of an oil distribution circuit installed on the planet carrier 13.

The basins comprise lubricating oil outlets intended for example for the lubrication of the reduction gear 10.

With reference to FIGS. 2 and 3, the oil distribution circuits are of two types here. A first series of oil distribution circuits corresponds to first pipes 43, which are distributed regularly over the circumference of the reduction gear 10 and in a number equal to that of the planets 12. These pipes 43 leave the opening 42a of the bottom of the first series of basins 37*a* radially and penetrate into the inner enclosure of each planet gear shaft 16, which is closed by the planet carrier 13. The oil which circulates in the first pipes 43 penetrates into the inner cavity of each planet gear axis, then passes, due to the centrifugal force, into the guide channels 44, which cross these planet gear axes 16 by being oriented radially. The channels 44 lead to the periphery of the planet gear axes 16, at the bearings supporting the planet gears 12 and thus ensuring the lubrication of these bearings. The second series of oil distribution circuits includes second pipes 45 which progress from the openings 42*b* at the bottom of the basins 37*b* of the second series of basins between the planet gears 12 and are divided into several channels 45*a*, 45*b*. The channels 45*a*, 45*b* route oil toward the gearing formed by the gears of the planet gears 12 and the sun gear 11, on the one hand, and the planet gears 12 and the outer ring gear 14, on the other hand. Each channel 45*a* extends axially along the gears of a planet 12, between them and the sun gear 11, in the form of a lubrication ramp over the entire width of the gears. The channel 45*b*, which supplies the gearing between the ring gear 14 and the gears of the planet 12, projects its oil in the center of the cylinder formed by each planet 12. As shown, each planet 12 is made in the form of two parallel gears.

Their teeth are oriented diagonally relative to the axis of rotation of the planet gear 12, so as to give them the function of grooves in which the oil is driven, from the center of the cylinder to its periphery, to lubricate the gearing over its entire width. In this example, the first oil distribution circuits 43-44 which lubricate the bearing supporting the planet gears need to drive a greater flow rate of oil than the second circuits 45-45*a*-45*b*. For this reason, the circumferential extension of the basins 37*a* of the first series, which correspond to them, is greater than that of the basins 37*b* of the second series. Here, ratio of two-thirds to one-third is desired in the flow rate of oil in nominal operation; the circumferential extension of the two series of basins 37*a*, 37*b* substantially takes up this ratio.

The assembly has been represented here by referring to a reduction gear architecture 10 with four planets 12 with two series of oil distribution circuits 43-44, 45-45*a*-45*b* of two different types. For other reduction gear architectures, the number of basins per series can be different. Likewise, the number of series of basins having similar circumferential extensions can be different, depending on the types of oil distribution circuits. For example, the second oil distribution circuits could be subdivided in two, one dedicated to the gearing of the gears of the planets 12 with the sun gear 11 and the other dedicated to the gearing with the ring gear 14. In this case, a variant embodiment of the impeller for recovering the oil can be considered, with three series of basins with different circumferential extensions. Several modes of implementation of the lubrication device will now be described, in relation to the arrangement of the basins 37*a*, 37*b* in the cup 35.

It is understood, however, that a structure of this type can cause eddies and irregularities in the distribution of the mass of fluid around they axis X.

The invention thus proposes producing openings 58 in the circumferential separation walls 38 so as to allow passage of fluid between the adjacent basins without requiring an overflow of the volume of the basin considered above the height h of its walls 38.

FIGS. 5, 6 and 7 illustrate this aspect of the invention.

Thus two views are shown in FIGS. 5 and 6 shown the detail of openings 58 formed in the walls 38 separating the different basins 37*a* and 37*b*.

FIG. 5 is a section view along a plane parallel to the axis X, along a plane passing through a wall 38. Seen in it therefore is an example of openings 58 formed in a wall 38 separating two basins. In the example illustrated, 6 openings 58 are formed in an inner radial half of the wall 38. By inner radial half is meant here the portion of the wall 38 delimited by an annulus positioned between the radii R2 and R2+h/2. As a variant, the openings 58 could be formed in the outer radial half of the wall 38, i.e. a portion of the wall 38 delimited by an annulus positioned between the radii R2+h/2 and R2+h. More generally, all or a part of the openings 58 can be formed in the inner radial half or in the outer radial half of the wall 38. As a variant, the openings 58 can be formed in any portion of the wall 38.

The openings 58 are arranged so as to define one or more rows of openings in the internal walls. The rows are for example arranged in lines and in columns, so as to form a matrix of openings.

In the example illustrated, the fluid circulation channels 53 are formed in the shaft 3. It is easily understood that this embodiment is not limiting.

The openings 58 thus allow ensuring a transfer of fluid between the different basins without necessitating an overflow from the basin considered.

An embodiment of this type thus allows accomplishing equalization of the fluid level between the different basins, without generating fluid eddies as would be the case for overflow over walls 38 which would not have such openings 58.

The positioning of the openings 58 on the walls 38 allows determining the level of fluid at which the transfer between the different basins is accomplished.

FIG. 7 shows a variant in which the walls 38 delimiting the different basins within the cup 35 of the impeller are formed on the shaft 3.

The walls 38 thus extend radially around the shaft 3, and form walls extending in the direction defined by the axis X.

As for the embodiment described previously, the walls 38 have openings 58 formed so as to allow passage of fluid between the different basins thus formed.

As before, if it is considered that the walls 38 have a height h measured in the radial direction and that the shaft 3 has an outer radius R, the openings 58 can be formed in an inner radial portion, comprised between R and R+h/2, in an outer radial portion comprised between R+h/2 and R+h, or in any portion of the walls 38.

All or part of the walls 38 can be provided with such openings 58.

The invention as proposed thus allows improving the balancing of the fluid in a fluid distribution impeller compared with known structures, which lead to overflows of fluid and allow initiating a beginning of balancing only once a strongly unbalanced situation has been established.

Although the present invention has been described by referring to specific exemplary embodiments, it is obvious that modifications and changes can be performed on these examples without departing from the general scope of the invention as defined by the claims. In particular, individual features of the different embodiments that are illustrated/mentioned can be combined into additional embodiments. Consequently, the description and the drawings should be considered in an illustrative, rather than a restrictive sense.

It is also obvious that all the features described with reference to a method are transposable, alone or in combination, to a device, and conversely all the features described with reference to a device are transposable, alone or in combination, to a method.

The invention claimed is:

1. A lubrication device for a turbomachine reduction gear having a main axis,
    the device comprising an annular lubricating oil collecting cup delimited by a first wall and a second wall,
    said cup being divided by internal walls extending between the first wall and the second wall so as to define a plurality of angular sectors forming oil collecting basins, the basins being circumferentially adjacent around the axis and comprising lubricating oil outlets intended for the lubrication of the reduction gear,
    wherein one or more of said internal walls have openings allowing oil to pass between the circumferentially adjacent basins
    wherein said openings are formed in one or more of said internal walls so as to define one or more rows of openings in said one or more internal walls.

2. The device according to claim 1, wherein each of said internal walls comprises at least one opening.

3. The device according to claim 1, wherein said internal walls have a height h measured in the radial direction, and in which the openings are formed in a radially internal half of each internal wall.

4. The device according to claim 1, wherein said internal walls have a height h measured in a radial direction relative to the main axis, and wherein openings are formed in a radially external half of each internal wall.

5. The device according to claim 1, wherein said rows of openings are arranged, in said one or more internal walls, in lines and in columns, so as to form a matrix of openings.

6. A turbomachine comprising a reduction gear according to claim 5.

7. A reduction gear comprising an input shaft, a sun wheel, planet gears and an output shaft,
    said reduction gear comprising a device according to claim 1 mounted axially around the input shaft, so that the oil outlets of the basins are oriented to lead to the planet gears, the sun wheel or the planet gear bearings.

8. An assembly comprising a shaft extending around a main axis and a device according to claim 1 extending around said main axis, wherein said internal walls are formed on the shaft.

9. The assembly comprising a shaft extending around a main axis and a device according to claim 1 extending around said main axis, wherein said internal walls are formed on the cup.

* * * * *